US012800378B2

(12) United States Patent
Kravets et al.

(10) Patent No.: US 12,800,378 B2
(45) Date of Patent: Nov. 17, 2026

(54) FLUID LEVEL SENSOR

(71) Applicant: Cypress Semiconductor Corporation, San Jose, CA (US)

(72) Inventors: Igor Kravets, Lviv (UA); Paul M. Walsh, Cork (IE); Vasyl Mandziy, Schyrets (UA); Oleksandr Karpin, Lviv (UA)

(73) Assignee: Infineon Technologies Americas Corp., El Segundo, CA (US)

( * ) Notice: Subject to any disclaimer, the term of this patent is extended or adjusted under 35 U.S.C. 154(b) by 335 days.

(21) Appl. No.: 18/762,534

(22) Filed: Jul. 2, 2024

(65) Prior Publication Data

US 2026/0009669 A1 Jan. 8, 2026

(51) Int. Cl.
*G01F 23/26* (2022.01)

(52) U.S. Cl.
CPC .................................... *G01F 23/26* (2013.01)

(58) Field of Classification Search
None
See application file for complete search history.

(56) References Cited

U.S. PATENT DOCUMENTS

| | | | | |
|---|---|---|---|---|
| 7,219,545 | B2 * | 5/2007 | Salzmann | G01F 23/242 73/304 C |
| 7,258,005 | B2 * | 8/2007 | Nyce | G01F 23/263 73/304 C |
| 7,373,817 | B2 * | 5/2008 | Burdi | F04B 49/02 73/304 C |
| 9,658,095 | B2 * | 5/2017 | Winkens | G01F 23/263 |
| 10,605,643 | B2 * | 3/2020 | Convent | G01F 23/284 |
| 12,442,676 | B2 * | 10/2025 | Appeldorn | G01F 23/265 |
| 2020/0271504 | A1 * | 8/2020 | Yoshino | G01F 23/268 |

* cited by examiner

*Primary Examiner* — Peter J Macchiarolo
*Assistant Examiner* — Jermaine L Jenkins

(57) ABSTRACT

One or more computing devices, systems, and/or methods are provided. In an embodiment of the techniques presented herein, a fluid sensor has a sensor electrode, a first sensor trace connected to the sensor electrode, a second sensor trace adjacent the first sensor trace, a first ground electrode adjacent a first edge of the sensor electrode, a second ground electrode adjacent a second edge of the sensor electrode opposite the first edge, a first shield trace adjacent the first sensor trace, and a second shield trace adjacent the second sensor trace.

20 Claims, 7 Drawing Sheets

FLUID LEVEL SENSOR

BACKGROUND

Various sensing techniques may be used for sensing a level or a characteristic of a fluid in a container. Some applications for fluid level sensing include vehicle systems, industrial systems, or consumer products. Many of these applications require non-contact sensing where there is no electrical contact between the sensor and the fluid.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a fluid sensor comprises a sensor electrode, a first sensor trace connected to the sensor electrode, a second sensor trace adjacent the first sensor trace, a first ground electrode adjacent a first edge of the sensor electrode, a second ground electrode adjacent a second edge of the sensor electrode opposite the first edge, a first shield trace adjacent the first sensor trace, and a second shield trace adjacent the second sensor trace.

In an embodiment of the techniques presented herein, a method comprises applying a first excitation signal to a first sensor trace connected to a sensor electrode, applying, concurrently with applying the first excitation signal, a second excitation signal to a second sensor trace adjacent the first sensor trace, a first shield trace adjacent the first sensor trace, and a second shield trace adjacent the second sensor trace, applying a ground signal to a first ground electrode adjacent a first side of the sensor electrode, applying the ground signal to a second ground electrode adjacent a second side of the sensor electrode, and measuring a response signal from the sensor electrode after applying the first excitation signal to determine a fluid level measurement.

In an embodiment of the techniques presented herein, a system comprises means for applying a first excitation signal to a first sensor trace connected to a sensor electrode, means for applying, concurrently with applying the first excitation signal, a second excitation signal to a second sensor trace adjacent the first sensor trace, a first shield trace adjacent the first sensor trace, and a second shield trace adjacent the second sensor trace, means for applying a ground signal to a first ground electrode adjacent a first side of the sensor electrode, means for applying the ground signal to a second ground electrode adjacent a second side of the sensor electrode, and means for measuring a response signal from the sensor electrode after applying the first excitation signal to determine a fluid level measurement.

In an embodiment of the techniques presented herein, a fluid sensor comprises a sensor array comprising a first sensor electrode, a second sensor electrode, a third sensor electrode between the first sensor electrode and the second sensor electrode, a first sensor trace connected to the first sensor electrode, a second sensor trace adjacent the first sensor trace and connected to the second sensor electrode, and a third sensor trace between the first sensor trace and the second sensor trace and connected to the third sensor electrode, a first ground electrode adjacent a first edge of the sensor array, a second ground electrode adjacent a second edge of the sensor array opposite the first edge, a first shield trace adjacent the first sensor trace, and a second shield trace adjacent the second sensor trace.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
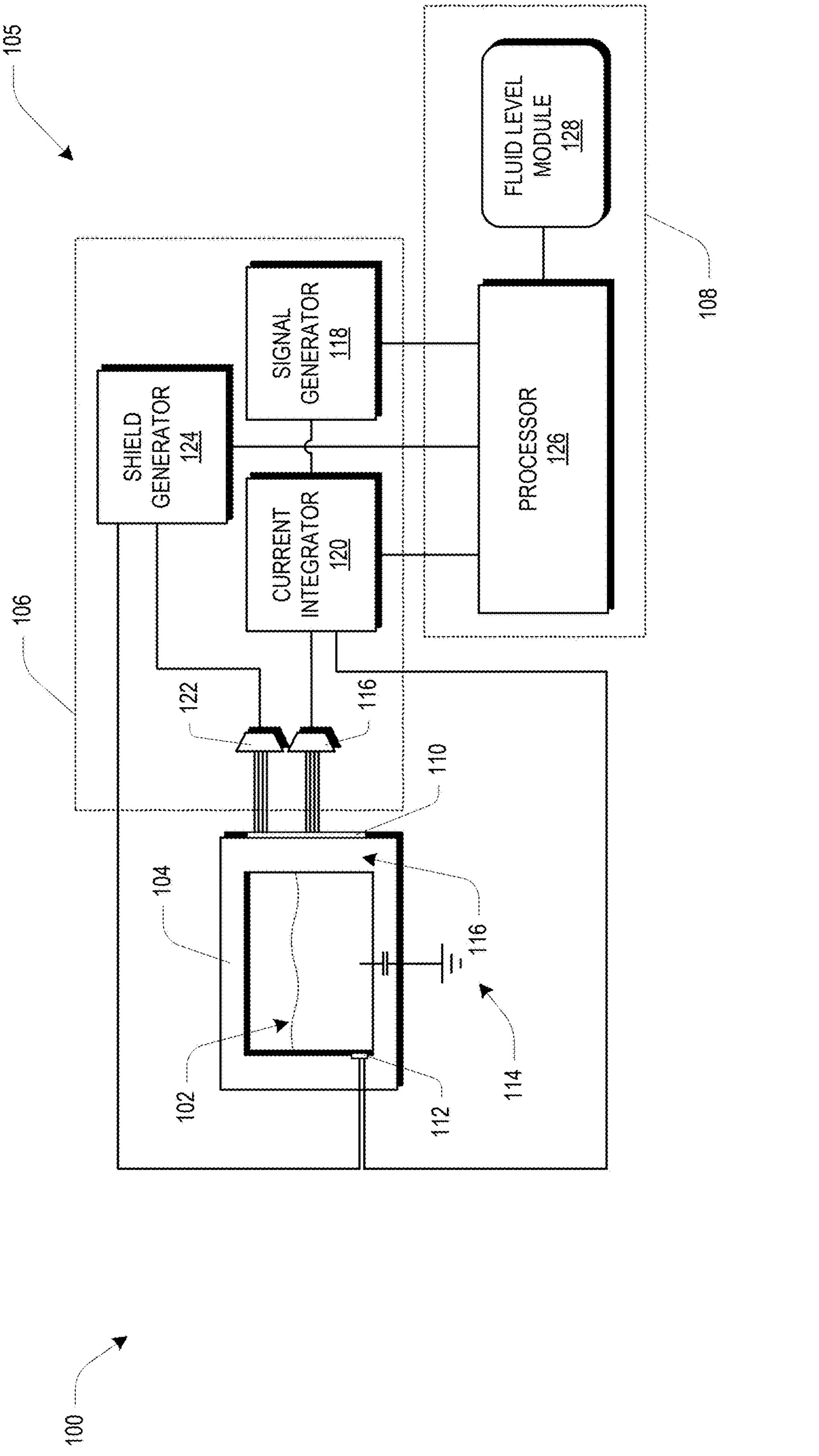
FIG. 1 is a block diagram of a level detection system for non-contact fluid level sensing of a fluid in a container, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

Fluid level detection finds applications in auto, consumer, and industrial spaces. In vehicle applications containers or reservoirs may be provided for windscreen washing fluid, fuel, or diesel exhaust treatment fluid (AdBlue). In consumer applications, containers may be provided for appliances, such as refrigerators, vacuum cleaners, washing machines or coffee makers. In industrial applications, containers may include fermentation vessels, milk storage containers, technical fluid containers (e.g., oil or hydraulic fluid), process fluid containers, or the like.

In some embodiments, a fluid level sensor includes sensor electrodes connected to sensor traces. Ground electrodes are provided adjacent the sensor electrodes. Shield traces are provided adjacent the edge sensor traces to provide consistent parasitic capacitance characteristics for the sensor traces. The sensor electrodes may have similar areas, and the sensor traces and the shield traces may have similar areas to provide reduced sensitivity to temperature and other external noise factors.

FIG. 1 is a block diagram of a level detection system 100 for non-contact fluid level sensing of a fluid 102 in a container 104, in accordance with some embodiments. In some embodiments, the level detection system 100 comprises a control unit 105 including analog processing blocks 106 and digital processing blocks 108. The analog processing blocks 106 are coupled to a level sensor 110 or a presence sensor 112, where the level sensor 110 or the presence sensor 112 are mounted on exterior surfaces of the container 104 that holds the fluid 102. In some embodiments, the container 104 has an ambient ground 114 that represents the grounding of the fluid 102.

In some embodiments, the level sensor 110 or the presence sensor 112 may include sensor electrodes, sensor traces, and shield elements. In some embodiments, the analog processing blocks 106 include interconnect logic 116 to couple a signal generator 118 and a current integrator 120 to an active sensor electrode of the level sensor 110 and interconnect logic 122 to couple a shield generator 124 to inactive sensor electrodes and shield elements of the level sensor 110. In some embodiments, the signal generator 118 generates an excitation signal, such as a rectangular signal, for a selected active sensor electrode and the current integrator 120 integrates the current provided to the selected active sensor electrode to determine charge transferred over a selected time interval. In some embodiments, the current integrator 120 employs a self-capacitance measurement principle to determine charge transferred to the sensor elements of the level sensor 110. A charge transfer measurement is iteratively determined for each sensor electrode of the level sensor 110 to determine the level of the fluid 102.

In some embodiments, the signal generator 118, the current integrator 120, and the shield generator 124 are also connected to the presence sensor 112 to generate a charge transfer measurement to determine if the presence sensor 112 is covered by the fluid 102.

The digital processing blocks 108 comprise a processor 126 and a fluid level module 128. In some embodiments, the processor 126 controls the signal generator 118 to generate the excitation signal and receives the current integration measurements from the current integrator 120. The processor 126 also controls the shield generator 124 to generate a shield signal for the inactive sensor electrodes and the shield elements. The fluid level module 128 analyzes the charge transfer measurements for each sensor element of the level sensor 110 to determine the level of the fluid 102 and determines if fluid is presence at the presence sensor 112.

Figure 2A:
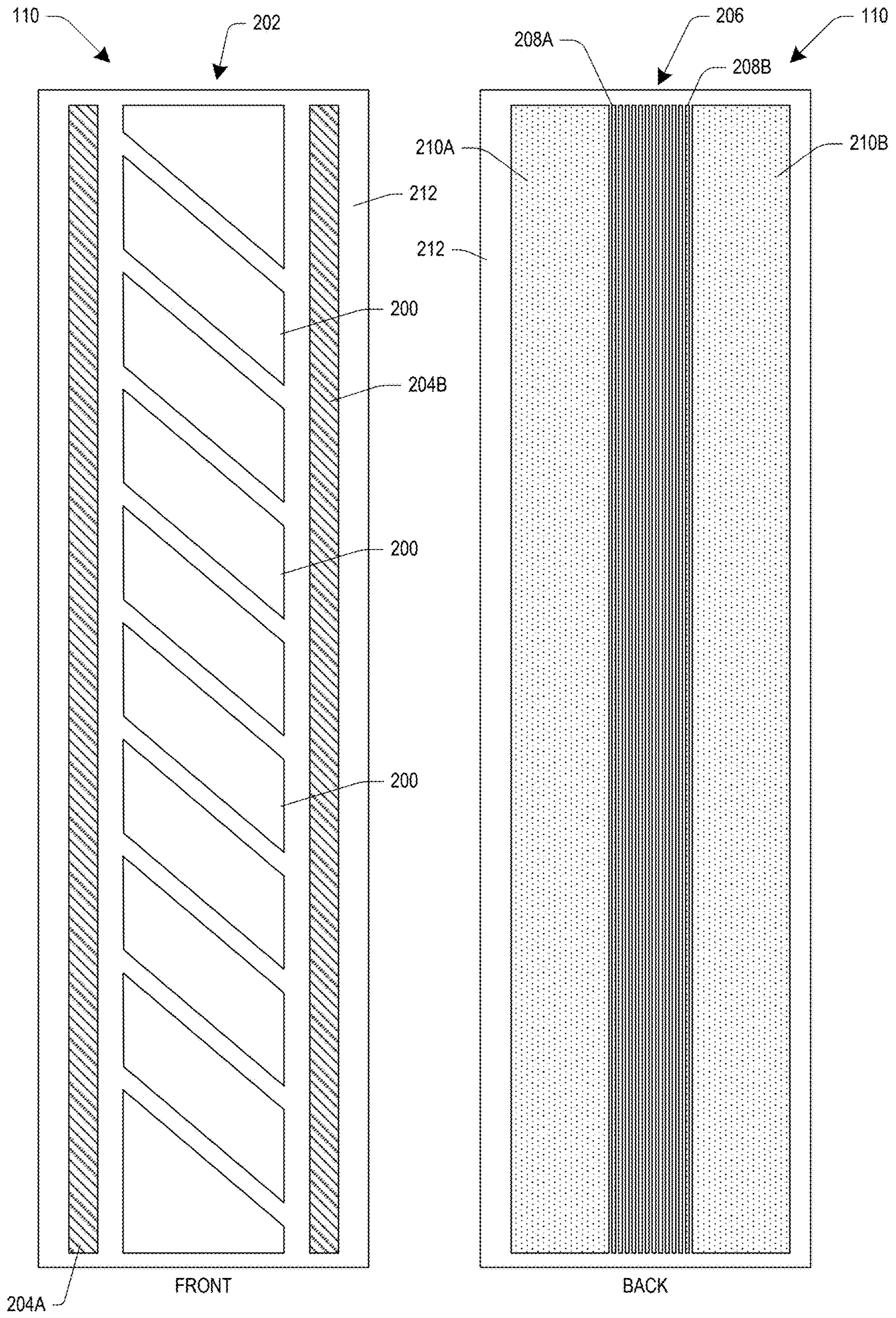
FIGS. 2A and 2B are diagrams of a level sensor, in accordance with some embodiments.
Figure 2B:
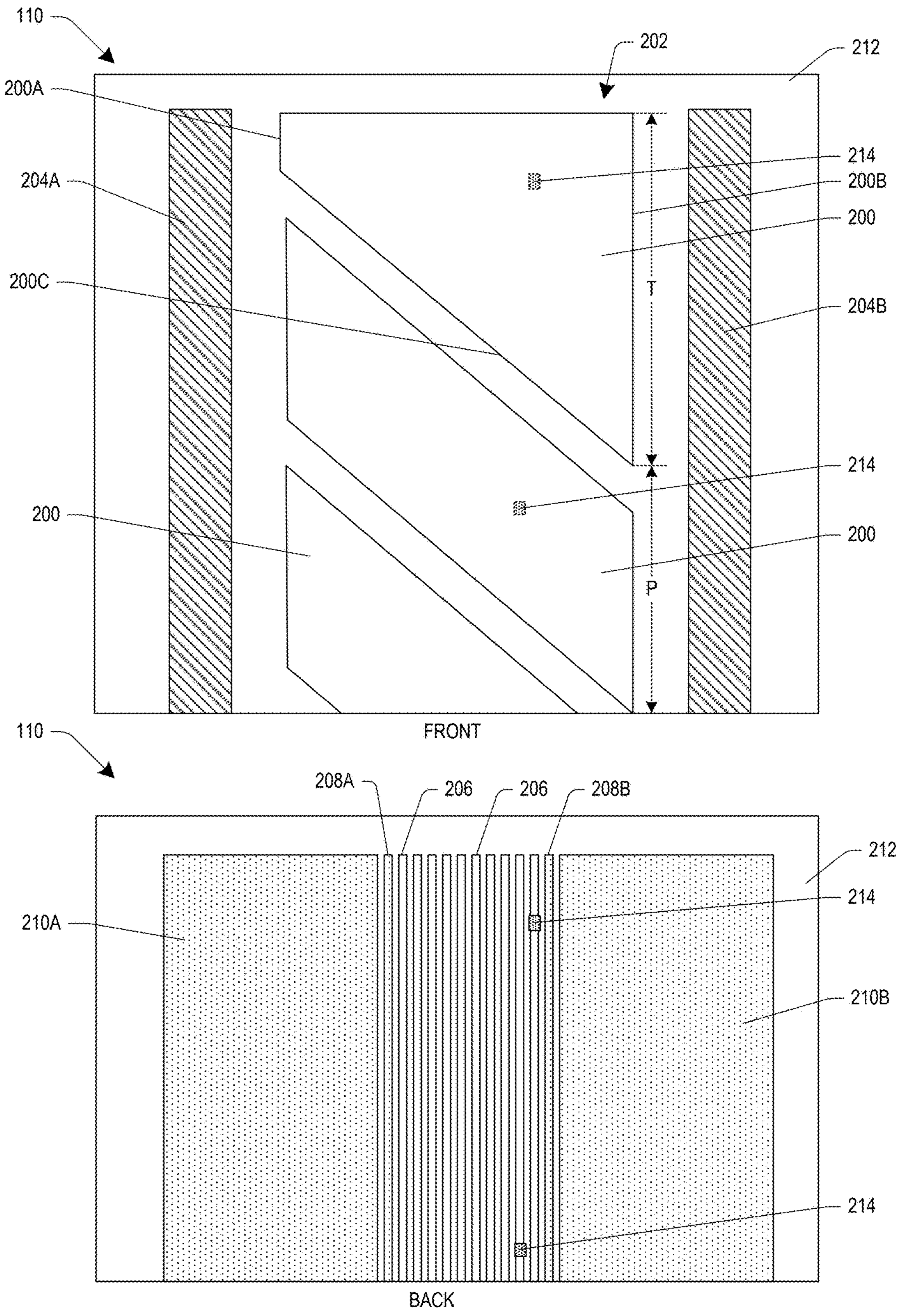

FIGS. 2A and 2B are diagrams of the level sensor 110, in accordance with some embodiments. Front and back views are illustrated. FIG. 2B is a partial close up view of portions of the level sensor 110. In some embodiments, the level sensor 110 comprises sensor electrodes 200 arranged in a sensor array 202, ground electrodes 204A, 204B, sensor traces 206, shield traces 208A, 208B, and optional shield electrodes 210A, 210B. The ground electrodes 204A, 204B are positioned adjacent and spaced apart from edges 200A, 200B of the sensor electrodes 200 of the sensor array 202. The sensor traces 206 are connected to the sensor electrodes 200. The shield traces 208A, 208B are provided adjacent the outside sensor traces 206. The shield electrodes 210A 210B, if provided, are adjacent the shield traces 208A, 208B such that the shield traces 208A, 208B are between the outside sensor traces 206 and the shield electrodes 210A, 210B. In some embodiments, the sensor array 202 and the ground electrodes 204A, 204B are arranged on one side of a printed circuit board 212, and the sensor traces 206, shield traces 208A, 208B, and optional shield electrodes 210A, 210B are provided on an opposite side of the printed circuit board 212. Conductive vias 214 may pass through the printed circuit board 212 to connect the sensor traces 206 to the sensor electrodes 200.

Referring to FIG. 2B, an edge 200C of a sensor electrode 200 extends from the first edge 200A to the second edge 200B at an oblique angle. In some embodiments, a tilt (T) for a sensor electrode 200 is related to a pitch (P) between the next sensor electrode 200 by the relationship:

$$T = 1.27 \cdot P - 1.4 \text{ mm}.$$

In some embodiments, the tilt and pitch are selected such that at least two sensor electrodes 200 are at least partially covered by the fluid 102 for a given fluid level.

To collect charge transfer measurements, the processor 126 selects an active sensor electrode 200 using the interconnect logic 116 and applies the excitation signal to the selected sensor electrode 200 using the signal generator 118. In some embodiments, the interconnect logic 116 is configured to select only one of the sensor electrodes 200 at a time. The interconnect logic 122 may be configured allow concurrent connections to the multiple sensor electrodes 200 not selected by the interconnect logic 116 and also to connect to the shield traces 208A, 208B and the shield electrodes 210A, 210B. Alternatively separate connections may be provided between the shield generator 124 and the shield traces 208A, 208B and the shield electrodes 210A, 210B. The shield generator 124 applies a second excitation signal to the sensor electrodes 200 not selected by the interconnect logic 116, the shield traces 208A, 208B, and the shield electrodes 210A, 210B. In some embodiments, the first excitation signal is the same as the second excitation signal. The signal generator 118 and the shield generator 124 may be integrated into a single unit that sends the same excitation signal to the sensor electrodes 200, the shield traces 208A, 208B, and the shield electrodes 210A, 210B and the interconnect logic 116 may connect the active sensor electrode 200 to the current integrator 120. In some embodiments, a ground potential is connected to the ground electrodes 204A, 204B. The first excitation signal generates a response signal in the selected sensor electrode 200, for example, based on self-capacitance, and the current integrator 120 integrates the response signal to generate a charge transfer measurement for the selected sensor electrode 200.

The charge transfer measurements for completely covered sensor electrodes 200 are substantially the same. Partially covered sensor electrodes 200 would have different charge transfer measurements depending on the degree of coverage by the fluid 102. The partially covered sensor electrodes 200 are identified by comparing the charge transfer measurements across the sensor electrodes 200 in the array. The difference between the charge transfer measurements for the sensor electrodes 200 partially covered by the fluid 102 determines the fluid level. The precise fluid level may be determined using an equation, a look-up table, a model, a neural network, or some other suitable technique for interpolating the fluid level using the charge transfer measurements.

In some embodiments, the elements of the level sensor 110 are dimensioned and arranged to reduce temperature sensitivity, silicon process sensitivity, and sensitivity to external factors, such as external noise, humidity, grounding, or some other external factor. In some embodiments, the sensor electrodes 200 have the same area, although not necessarily the same shape. For example, the top and bottom sensor electrodes 200 in the sensor array 202 may have trapezoidal or triangular shapes, and the intermediate sensor electrodes 200 may have parallelogram shapes. Other shapes for the sensor electrodes 200, such as rectangular or square shapes may be used. In some embodiments, the sensor traces 206 and the shield traces 208A, 208B have the same area, for example, the same length and width. Providing the same area for the sensor electrodes 200 and providing the same areas for the sensor traces 206 and the shield traces 208A, 208B reduces temperature sensitivity. The shield traces 208A, 208B provide consistency for the outside sensor traces 206 compared to the interior sensor traces 206 such that the parasitic capacitances between a given sensor trace 206 and its neighboring sensor traces 206 or shield trace 208A, 208B are substantially the same. This feature also reduces temperature and silicon process sensitivity of the level sensor 110. For an ungrounded fluid 102, the ground electrodes 204A, 204B may have a combined area substantially the same as the combined area of the sensor electrodes 200 in the sensor array 202. For a grounded fluid 102, the ground electrodes 204A, 204B may have a combined area of about 20% of the combined area of the sensor electrodes 200 in the sensor array 202.

Figure 3A:
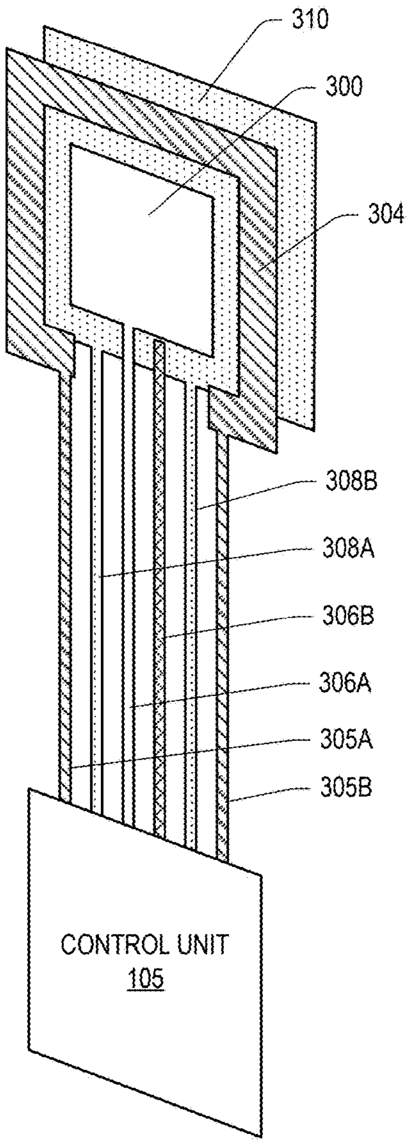
FIGS. 3A, 3B, and 3C are diagrams of a presence sensor, in accordance with some embodiments.
Figure 3B:
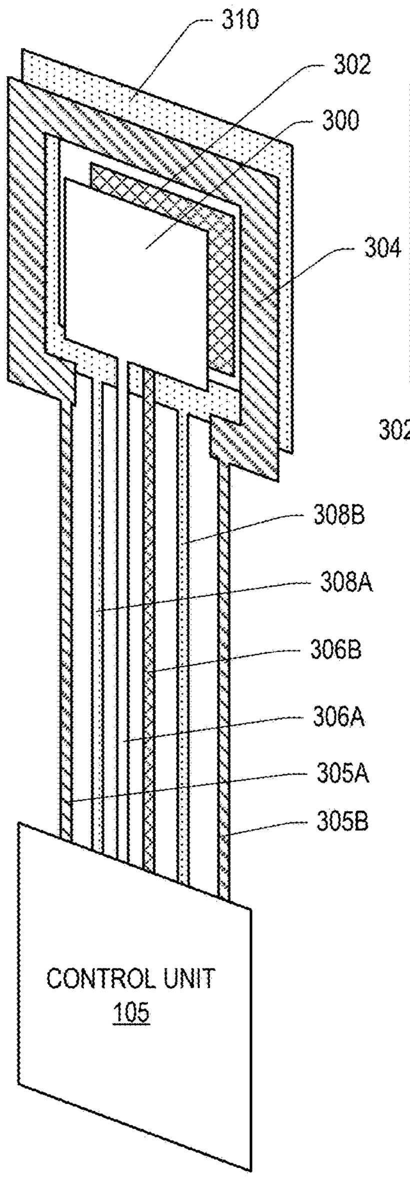
Figure 3C:
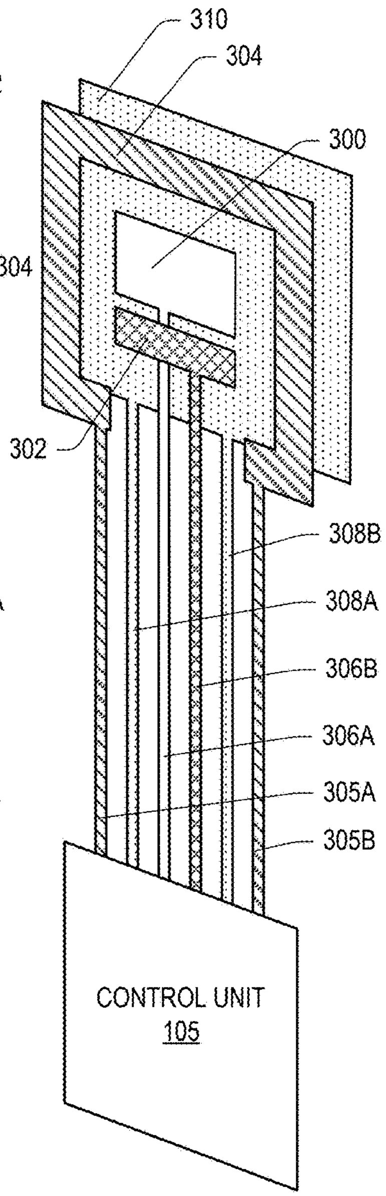

FIGS. 3A, 3B, and 3C are diagrams of embodiments of the presence sensor 112, in accordance with some embodiments. In some embodiments, the presence sensor 112 comprises a sensor electrode 300, a reference electrode 302, a ground electrode 304, ground traces 305A, 305B, sensor traces 306A, 306B, shield traces 308A, 308B, and an optional shield electrode 310. For ease of illustration, the printed circuit board is omitted. The ground traces 305A, 305B are connected to the ground electrode 304, the sensor traces 306A, 306B are connected to the sensor electrode 300 and reference electrode 302 (if present), respectively, and the shield traces 308A, 308B are connected to the shield electrode 310. Although the ground traces 305A, 305B, sensor traces 306A, 306B, and shield traces 308A, 308B are illustrated as running from the control unit 105 to the respective electrodes, the ground traces 305A, 305B, sensor traces 306A, 306B, and shield traces 308A, 308B may be on one side of the printed circuit board and connected to respective electrodes using conductive vias through the printed circuit board as illustrated in FIGS. 2A and 2B.

In the embodiment of FIG. 3A, the reference electrode 302 is omitted, and the sensor trace 306B acts as a sensor electrode. The sensor electrode 300 and the ground electrode 304 are on one side of the printed circuit board, and the shield electrode 310 is on the opposite side of the printed circuit board.

In the embodiment of FIG. 3B, the sensor electrode 300 and the ground electrode 304 are on one side of the printed circuit board, and the reference electrode 302 and the shield electrode 310 are on the opposite side of the printed circuit board. The shield electrode 310 at least partially surrounds, but is spaced apart from, the reference electrode 302.

In the embodiment of FIG. 3C, the sensor electrode 300, the reference electrode 302, and the ground electrode 304 are on one side of the printed circuit board, and the shield electrode 310 is on the opposite side of the printed circuit board. The shield electrode 310 may include a first electrode the sensor electrode 300 and a second electrode for the reference electrode 302.

To determine the presence of the fluid 102 proximate the presence sensor 112, the processor 126 applies the excitation signal to the sensor electrode 300 using the signal generator 118. The shield generator 124 applies a second excitation signal to the sensor trace 306B and the reference electrode 302 (FIGS. 3B and 3C), the shield traces 308A, 308B, and the shield electrode 310. In some embodiments, the first excitation signal is the same as the second excitation signal. The signal generator 118 and the shield generator 124 may be integrated into a single unit that sends the same excitation signal to the sensor electrode 300, the shield traces 308A, 308B, and the shield electrode 310 and the sensor electrode 300 or the reference electrode 302 may be selectively connected to the current integrator 120. In some embodiments, a ground potential is connected to the ground electrode 304 through the ground traces 305A, 305B. The first excitation signal generates a response signal in the sensor electrode 300, for example, based on self-capacitance, and the current integrator 120 integrates the response signal to generate a charge transfer measurement for the sensor electrode 300.

The processor 126 iterates by applying the excitation signal to the reference electrode 302 using the signal generator 118. The shield generator 124 applies a second excitation signal to the sensor trace 306A and the sensor electrode 300, the shield traces 308A, 308B, and the shield electrode 310. In some embodiments, a ground potential is connected to the ground electrode 304 through the ground traces 305A, 305B. The first excitation signal generates a response signal in the reference electrode 302, for example, based on self-capacitance, and the current integrator 120 integrates the response signal to generate a charge transfer measurement for the reference electrode 302. The charge transfer measurement for the sensor electrode 300 and the charge transfer measurement for the reference electrode 302 are used to determine the presence of the fluid 102. In some embodiments, the presence of the fluid 102 is detected if the difference between the response signals from sensor electrode 200 and the reference electrode 202 exceeds a threshold.

In some embodiments, the elements of the presence sensor 112 are dimensioned and arranged to reduce temperature sensitivity, silicon process sensitivity, and sensitivity to external factors, such as external noise, humidity, grounding, or some other external factor. In some embodiments, the sensor electrode 300 and the reference electrode 302 (FIG. 3B) have the same area. In some embodiments, the area of the sensor electrode 300 is about double the area of the reference electrode 302 (FIG. 3C). The sensor electrode 300 or the reference electrode 302 may have trapezoidal, triangular, parallelogram, rectangular, square, or other shapes. In some embodiments, at least some of the sensor traces 306A, 306B, the ground traces 305A, 305B, or the shield traces 308A, 308B have the same area, for example, the same length and width. For an ungrounded fluid 102, the ground electrode 304 may have a combined area substantially the same as the area of the sensor electrode 300 (FIG. 3A or 3B) or the combined area of the sensor electrode 300 and the reference electrode 302 (FIG. 3C.

Figure 4:
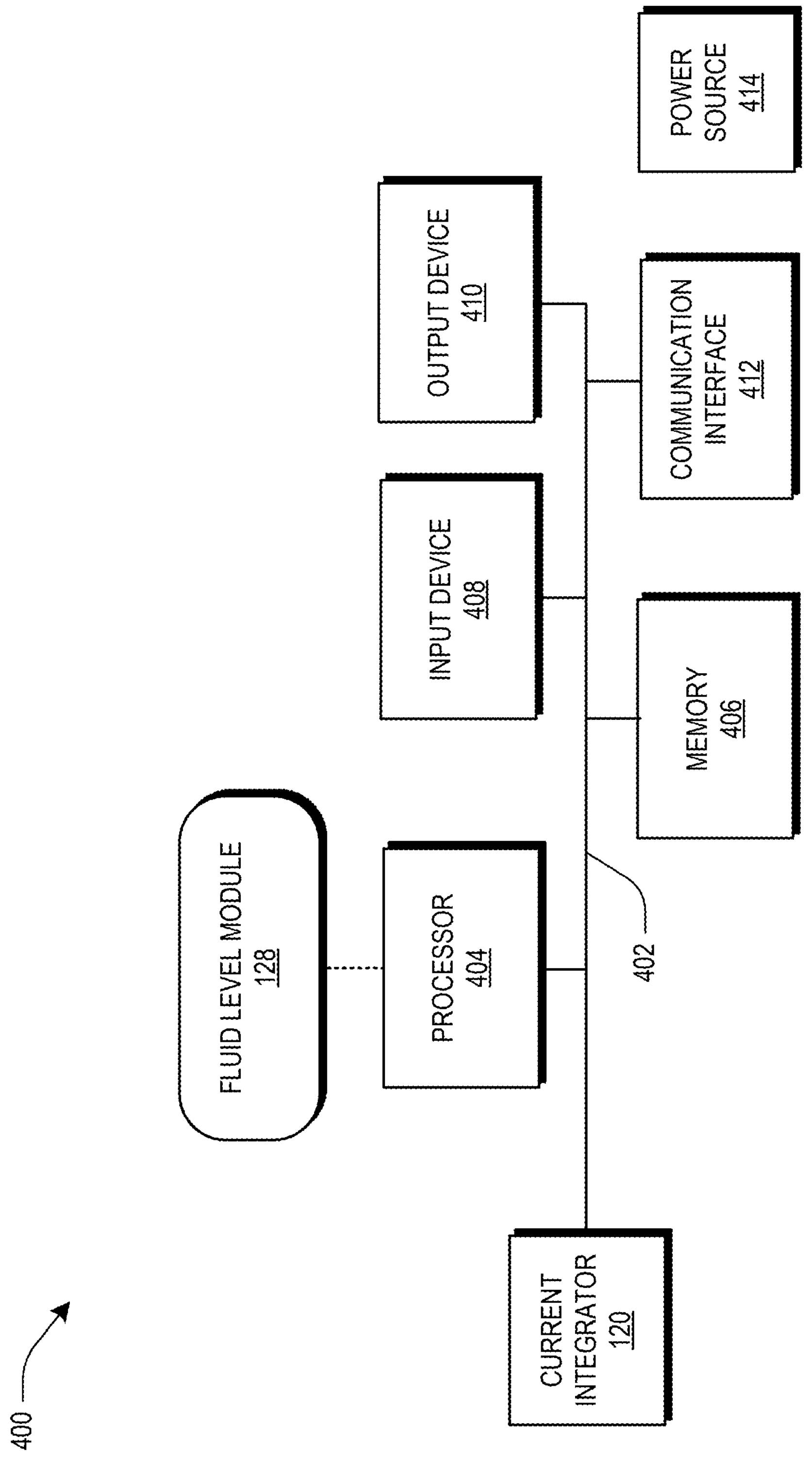
FIG. 4 is a diagram of a processing unit, in accordance with some embodiments.

FIG. 4 is a diagram of a device 400 for implementing the level detection system 100, in accordance with some embodiments. In some embodiments, the device 400 comprises a bus 402, a processor 404 (e.g., the processor 126), a memory 406 that stores software instructions or operations, an input device 408, an output device 410, a communication interface 412, and a power source 414, such as a battery. The processor 404 receives data from the current integrator 120 and implements a software application that implements the fluid level module 128. The device 400 may include fewer components, additional components, different components, and/or a different arrangement of components than those illustrated in FIG. 4.

According to some embodiments, the bus 402 includes a path that permits communication among the components of the device 400. For example, the bus 402 may include a system bus, an address bus, a data bus, and/or a control bus. The bus 402 may also include bus drivers, bus arbiters, bus interfaces, clocks, and so forth. The processor 404 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 404 may be implemented as hardware (e.g., a microprocessor, etc.), a combination of hardware and software (e.g., a SoC, an ASIC, etc.), may include one or multiple memories (e.g., cache, etc.), etc.

In some embodiments, the processor 404 controls the overall operation or a portion of the operation(s) performed by the processor 126 and the fluid level module 128. The processor 404 performs one or multiple operations based on an operating system and/or various applications or computer programs (e.g., software). The processor 404 accesses instructions from the memory 406, from other components of the device 400, and/or from a source external to the device 400 (e.g., a network, another device, etc.). The processor 404 may perform an operation and/or a process based on various techniques including, for example, multithreading, parallel processing, pipelining, interleaving, etc.

In some embodiments, the memory 406 includes one or multiple memories and/or one or multiple other types of storage mediums. For example, the memory 406 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The memory 406 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 406 may include drives for reading from and writing to the storage medium. The memory 406 may be external to and/or removable from the device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 406 may store data, software, and/or instructions related to the operation of the level detection system 100.

The communication interface 412 permits the device 400 to communicate with other devices, networks, systems, sensors, and/or the like on a network. The communication interface 412 may include one or multiple wireless interfaces and/or wired interfaces. For example, the communication interface 412 may include one or multiple transmitters and receivers, or transceivers. The communication interface 412 may operate according to a protocol stack and a communication standard. In some embodiments, the communication interface 412 includes an antenna. The communication interface 412 may include various processing logic or circuitry (e.g., multiplexing/de-multiplexing, filtering, amplifying, converting, error correction, etc.). In some embodiments, the communication interface 412 operates using a long range wireless protocol, such as a cellular protocol or a WiFi protocol, a short range protocol, such as BLUETOOTH™, or a wired protocol, such as Ethernet.

In some embodiments, the input device 408 permits an input into the device 400. For example, the input device 408 may comprise a keyboard, a mouse, a display, a touchscreen, a touchless screen, a button, a switch, an input port, speech recognition logic, and/or some other type of suitable visual, auditory, or tactile input component. The output device 410 permits an output from the device 400. For example, the output device 410 may include a speaker, a display, a touchscreen, a touchless screen, a projected display, a light, an output port, and/or some other type of suitable visual, auditory, or tactile output component. In some embodiments, the output device 410 may be remote and may communicate with the processor 404 using the communication interface 412.

Figure 5:
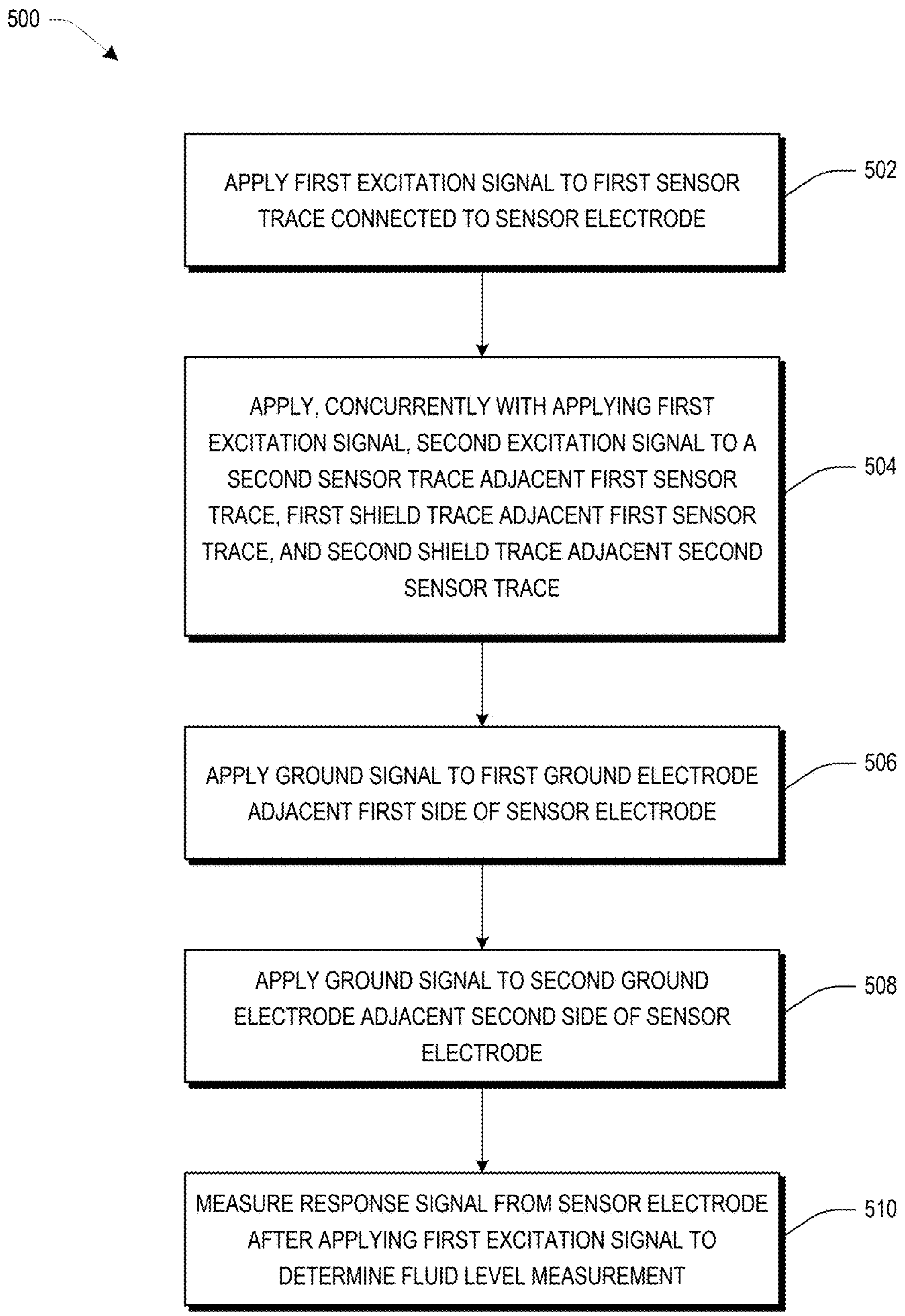
FIG. 5 is a diagram illustrating a method for fluid sensing, in accordance with some embodiments.

FIG. 5 is a flow chart illustrating an example method 500 for fluid sensing, in accordance with some embodiments. At 502, a first excitation signal is applied to a first sensor trace 206, 306A connected to a sensor electrode 200, 300. At 504, concurrently with applying the first excitation signal, a second excitation signal is applied to a second sensor trace 206, 306B adjacent the first sensor trace 206, 306A, a first shield trace 208A, 308A adjacent the first sensor trace 206, 306A, and a second shield trace 208B, 308B adjacent the second sensor trace 206, 306B. At 506, a ground signal is applied to a first ground electrode 204A, 204B, 304 adjacent a first side of the sensor electrode 200, 300. At 508, the ground signal to a second ground electrode 204A, 204B, 310 adjacent a second side of the sensor electrode 200, 300. At 510, a response signal from the sensor electrode 200, 300 after applying the first excitation signal is measured to determine a fluid level measurement.

Figure 6:
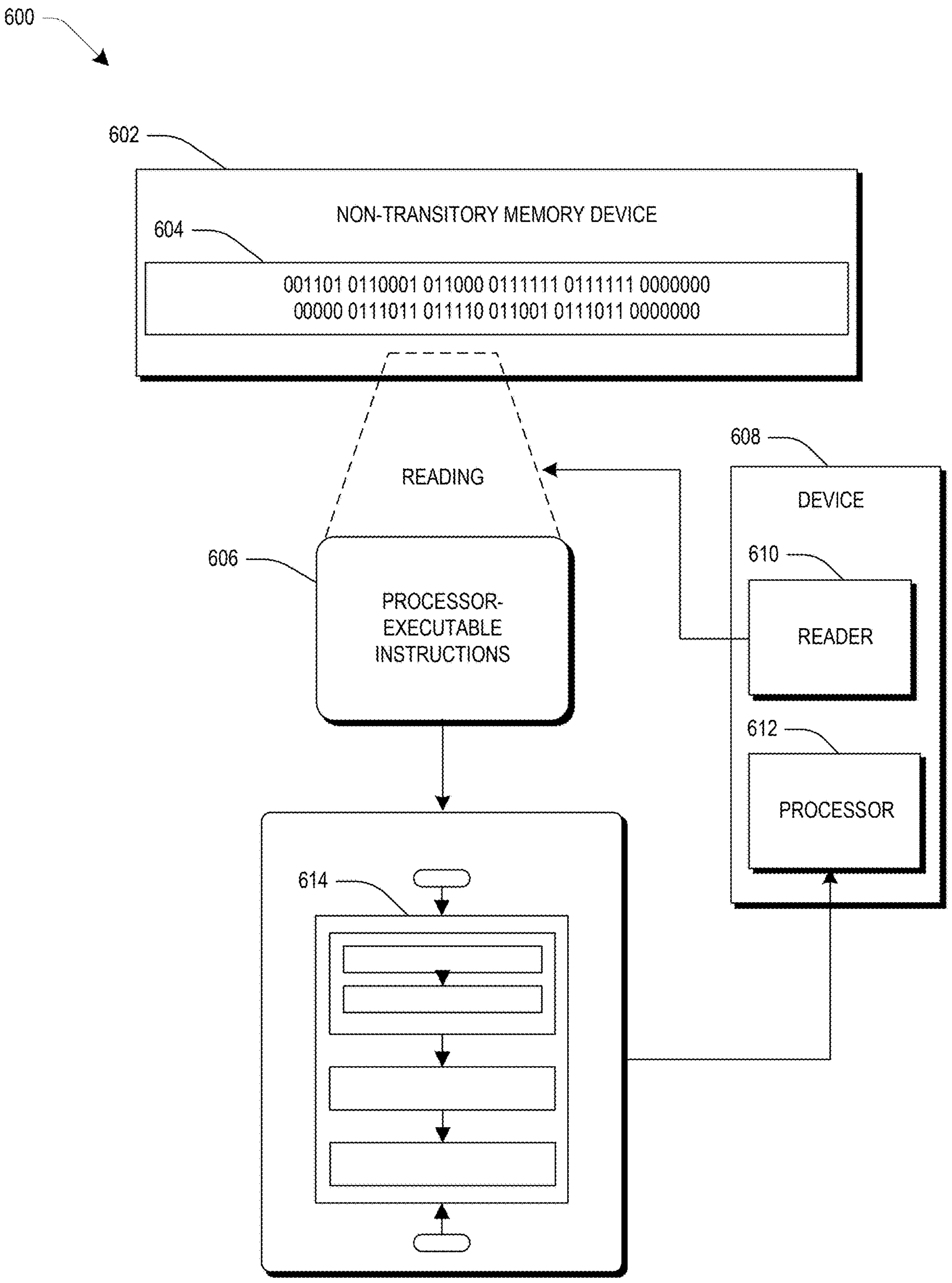
FIG. 6 illustrates an exemplary embodiment of a computer-readable medium, in accordance with some embodiments.

FIG. 6 illustrates an exemplary embodiment 600 of a computer-readable medium 602, in accordance with some embodiments. One or more embodiments involve a computer-readable medium comprising processor-executable instructions configured to implement one or more of the techniques presented herein. The embodiment 600 comprises a non-transitory computer-readable medium 602 (e.g., a CD-R, DVD-R, flash drive, a platter of a hard disk drive, etc.), on which is encoded computer-readable data 604. This computer-readable data 604 in turn comprises a set of processor-executable computer instructions 606 that, when executed by a computing device 608 including a reader 610 for reading the processor-executable computer instructions 606 and a processor 612 for executing the processor-executable computer instructions 606, are configured to facilitate operations according to one or more of the principles set forth herein. In some embodiments, the processor-executable computer instructions 606, when executed, are configured to facilitate performance of a method 614, such as at least some of the aforementioned method(s). In some embodiments, the processor-executable computer instructions 606, when executed, are configured to facilitate implementation of a system, such as at least some of the one or more aforementioned system(s). Many such computer-readable media may be devised by those of ordinary skill in the art that are configured to operate in accordance with the techniques presented herein.

In an embodiment of the techniques presented herein, a fluid sensor comprises a sensor electrode, a first sensor trace connected to the sensor electrode, a second sensor trace adjacent the first sensor trace, a first ground electrode adjacent a first edge of the sensor electrode, a second ground electrode adjacent a second edge of the sensor electrode opposite the first edge, a first shield trace adjacent the first sensor trace, and a second shield trace adjacent the second sensor trace.

In an embodiment of the techniques presented herein, the fluid sensor comprises a second sensor electrode connected to the second sensor trace.

In an embodiment of the techniques presented herein, the sensor electrode has a third edge extending at an oblique angle from the first edge to the second edge, and the second sensor electrode has a first edge adjacent the first ground electrode, a second edge adjacent the second ground electrode, and a third edge adjacent the third edge of the sensor electrode.

In an embodiment of the techniques presented herein, the sensor electrode has a trapezoidal shape and a first area, and the second sensor electrode has a parallelogram shape and the first area.

In an embodiment of the techniques presented herein, the first sensor trace has a first area, and the first shield trace has the first area.

In an embodiment of the techniques presented herein, the sensor electrode has a first area, and the second sensor electrode has the first area.

In an embodiment of the techniques presented herein, the fluid sensor comprises a third ground electrode adjacent a third edge of the sensor electrode and connecting the first ground electrode to the second ground electrode, and a shield electrode adjacent the second sensor electrode, wherein the sensor electrode, the first ground electrode, the second ground electrode, and the third ground electrode are on a first side of a circuit board, the second sensor electrode and the shield electrode are on a second side of the circuit board opposite the first side, the first shield trace is connected to the shield electrode, and the second shield trace is connected to the shield electrode.

In an embodiment of the techniques presented herein, the fluid sensor comprises a third ground electrode adjacent a third edge of the sensor electrode and connecting the first ground electrode to the second ground electrode, and a shield electrode, wherein the sensor electrode, the second sensor electrode, the first ground electrode, the second ground electrode, and the third ground electrode are on a first side of a circuit board, the shield electrode is on a second side of the circuit board opposite the first side, the first shield trace is connected to the shield electrode, and the second shield trace is connected to the shield electrode.

In an embodiment of the techniques presented herein, the fluid sensor comprises a first shield electrode, and a second shield electrode, wherein the sensor electrode, the second sensor electrode, the first ground electrode, and the second ground electrode, are on a first side of a circuit board, the first shield electrode, the second shield electrode, the first sensor trace, the second sensor trace, the first shield trace, and the second shield trace are on a second side of the circuit board opposite the first side, the first shield trace is between the first sensor trace and the first shield electrode, the second shield trace is between the second sensor trace and the second shield electrode, the first sensor trace is connected to the sensor electrode by a first conductive via extending through the circuit board, and the second sensor trace is connected to the second sensor electrode by a second conductive via extending through the circuit board.

In an embodiment of the techniques presented herein, the fluid sensor comprises a shield electrode, and a control unit comprising a signal generator configured to selectively apply a first excitation signal to one of the sensor electrode or the second sensor electrode, a shield generator configured to selectively apply a second excitation signal to the shield electrode, the first shield trace, the second shield trace, and the other of the sensor electrode or the second sensor electrode concurrently with selectively applying the first excitation signal by the signal generator, and a current integrator configured to measure a response signal from one of the sensor electrode or the second sensor electrode after applying the first excitation signal to determine a fluid level measurement.

In an embodiment of the techniques presented herein, a method comprises applying a first excitation signal to a first sensor trace connected to a sensor electrode, applying, concurrently with applying the first excitation signal, a second excitation signal to a second sensor trace adjacent the first sensor trace, a first shield trace adjacent the first sensor trace, and a second shield trace adjacent the second sensor trace, applying a ground signal to a first ground electrode adjacent a first side of the sensor electrode, applying the ground signal to a second ground electrode adjacent a second side of the sensor electrode, and measuring a response signal from the sensor electrode after applying the first excitation signal to determine a fluid level measurement.

In an embodiment of the techniques presented herein, the method comprises applying the second excitation signal to a first shield electrode adjacent one of the first shield trace or the second shield trace.

In an embodiment of the techniques presented herein, the method comprises applying a third excitation signal to the second sensor trace, wherein the second sensor trace is connected to a second sensor electrode, applying, concurrently with applying the third excitation signal, a fourth excitation signal to the first sensor trace, the first shield trace, and the second shield trace, and measuring a second response signal from the second sensor electrode after applying the third excitation signal to determine a second fluid level measurement.

In an embodiment of the techniques presented herein, the method comprises combining the response signal and the second response signal.

In an embodiment of the techniques presented herein, a second sensor electrode is connected to the second sensor trace, the sensor electrode is on a first side of a circuit board, the second sensor electrode is on a second side of the circuit board opposite the first side, and determining the fluid level measurement comprises detecting a fluid presence condition.

In an embodiment of the techniques presented herein, a fluid sensor comprises a sensor array comprising a first sensor electrode, a second sensor electrode, a third sensor electrode between the first sensor electrode and the second sensor electrode, a first sensor trace connected to the first sensor electrode, a second sensor trace adjacent the first sensor trace and connected to the second sensor electrode, and a third sensor trace between the first sensor trace and the second sensor trace and connected to the third sensor electrode, a first ground electrode adjacent a first edge of the sensor array, a second ground electrode adjacent a second edge of the sensor array opposite the first edge, a first shield trace adjacent the first sensor trace, and a second shield trace adjacent the second sensor trace.

In an embodiment of the techniques presented herein, the first sensor electrode has a first area, the second sensor electrode has the first area, and the third sensor electrode has the first area.

In an embodiment of the techniques presented herein, the first sensor trace has a first area, the second sensor trace has the first area, the third sensor trace has the first area, the first shield trace has the first area, and the second shield trace has the first area.

In an embodiment of the techniques presented herein, the fluid sensor comprises a first shield electrode adjacent the first shield trace, and a second shield electrode adjacent the second shield trace.

In an embodiment of the techniques presented herein, the fluid sensor comprises a control unit comprising a signal generator configured to selectively apply a first excitation signal to one of the first sensor electrode, the second sensor electrode, or the third sensor electrode, a shield driver configured to selectively apply a second excitation signal to the first shield electrode, the second shield electrode, the first shield trace, the second shield trace, and others of the first sensor electrode, the second sensor electrode, or the third sensor electrode concurrently with selectively applying the first excitation signal by the signal generator, and a current integrator configured to measure a response signal from one of the first sensor electrode, the second sensor electrode, or the third sensor electrode after applying the first excitation signal to determine a fluid level measurement.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A fluid sensor, comprising:

a sensor electrode;

a first sensor trace connected to the sensor electrode;

a second sensor trace adjacent the first sensor trace;

a first ground electrode adjacent a first edge of the sensor electrode;

a second ground electrode adjacent a second edge of the sensor electrode opposite the first edge;

a first shield trace adjacent the first sensor trace; and a second shield trace adjacent the second sensor trace.

2. The fluid sensor of claim 1, comprising:

a second sensor electrode connected to the second sensor trace.

3. The fluid sensor of claim 2, wherein:

the sensor electrode has a third edge extending at an oblique angle from the first edge to the second edge; and the second sensor electrode has a first edge adjacent the first ground electrode, a second edge adjacent the second ground electrode, and a third edge adjacent the third edge of the sensor electrode.

4. The fluid sensor of claim 2, wherein:

the sensor electrode has a trapezoidal shape and a first area; and the second sensor electrode has a parallelogram shape and the first area.

5. The fluid sensor of claim 2, wherein:

the sensor electrode has a first area; and the second sensor electrode has the first area.

6. The fluid sensor of claim 2, comprising:

a third ground electrode adjacent a third edge of the sensor electrode and connecting the first ground electrode to the second ground electrode; and a shield electrode adjacent the second sensor electrode, wherein:

the sensor electrode, the first ground electrode, the second ground electrode, and the third ground electrode are on a first side of a circuit board;

the second sensor electrode and the shield electrode are on a second side of the circuit board opposite the first side;

the first shield trace is connected to the shield electrode; and the second shield trace is connected to the shield electrode.

7. The fluid sensor of claim 2, comprising:

a third ground electrode adjacent a third edge of the sensor electrode and connecting the first ground electrode to the second ground electrode; and a shield electrode, wherein:

the sensor electrode, the second sensor electrode, the first ground electrode, the second ground electrode, and the third ground electrode are on a first side of a circuit board;

the shield electrode is on a second side of the circuit board opposite the first side;

the first shield trace is connected to the shield electrode; and the second shield trace is connected to the shield electrode.

8. The fluid sensor of claim 2, comprising:

a first shield electrode; and a second shield electrode, wherein:

the sensor electrode, the second sensor electrode, the first ground electrode, and the second ground electrode, are on a first side of a circuit board;

the first shield electrode, the second shield electrode, the first sensor trace, the second sensor trace, the first shield trace, and the second shield trace are on a second side of the circuit board opposite the first side;

the first shield trace is between the first sensor trace and the first shield electrode;

the second shield trace is between the second sensor trace and the second shield electrode;

the first sensor trace is connected to the sensor electrode by a first conductive via extending through the circuit board; and the second sensor trace is connected to the second sensor electrode by a second conductive via extending through the circuit board.

9. The fluid sensor of claim 2, comprising:

a shield electrode;

a control unit, comprising:

a signal generator configured to selectively apply a first excitation signal to one of the sensor electrode or the second sensor electrode;

a shield generator configured to selectively apply a second excitation signal to the shield electrode, the first shield trace, the second shield trace, and the other of the sensor electrode or the second sensor electrode concurrently with selectively applying the first excitation signal by the signal generator; and a current integrator configured to measure a response signal from one of the sensor electrode or the second sensor electrode after applying the first excitation signal to determine a fluid level measurement.

10. The fluid sensor of claim 1, wherein:

the first sensor trace has a first area; and the first shield trace has the first area.

11. A method comprising:

applying a first excitation signal to a first sensor trace connected to a sensor electrode;

applying, concurrently with applying the first excitation signal, a second excitation signal to a second sensor trace adjacent the first sensor trace, a first shield trace adjacent the first sensor trace, and a second shield trace adjacent the second sensor trace;

applying a ground signal to a first ground electrode adjacent a first side of the sensor electrode;

applying the ground signal to a second ground electrode adjacent a second side of the sensor electrode; and measuring a response signal from the sensor electrode after applying the first excitation signal to determine a fluid level measurement.

12. The method of claim 11, comprising:

applying the second excitation signal to a first shield electrode adjacent one of the first shield trace or the second shield trace.

13. The method of claim 11, comprising:

applying a third excitation signal to the second sensor trace, wherein the second sensor trace is connected to a second sensor electrode;

applying, concurrently with applying the third excitation signal, a fourth excitation signal to the first sensor trace, the first shield trace, and the second shield trace; and measuring a second response signal from the second sensor electrode after applying the third excitation signal to determine a second fluid level measurement.

14. The method of claim 13, comprising:

combining the response signal and the second response signal.

15. The method of claim 11, wherein:

a second sensor electrode is connected to the second sensor trace;

the sensor electrode is on a first side of a circuit board;

the second sensor electrode is on a second side of the circuit board opposite the first side; and determining the fluid level measurement comprises detecting a fluid presence condition.

16. A fluid sensor, comprising:

a sensor array comprising:

a first sensor electrode;

a second sensor electrode;

a third sensor electrode between the first sensor electrode and the second sensor electrode;

a first sensor trace connected to the first sensor electrode;

a second sensor trace adjacent the first sensor trace and connected to the second sensor electrode; and a third sensor trace between the first sensor trace and the second sensor trace and connected to the third sensor electrode;

a first ground electrode adjacent a first edge of the sensor array;

a second ground electrode adjacent a second edge of the sensor array opposite the first edge;

a first shield trace adjacent the first sensor trace; and a second shield trace adjacent the second sensor trace.

17. The fluid sensor of claim 16, wherein:

the first sensor electrode has a first area;

the second sensor electrode has the first area; and the third sensor electrode has the first area.

18. The fluid sensor of claim 16, wherein:

the first sensor trace has a first area;

the second sensor trace has the first area;

the third sensor trace has the first area;

the first shield trace has the first area; and the second shield trace has the first area.

19. The fluid sensor of claim 16, comprising:

a first shield electrode adjacent the first shield trace; and a second shield electrode adjacent the second shield trace.

20. The fluid sensor of claim 19, comprising:

a control unit, comprising:

a signal generator configured to selectively apply a first excitation signal to one of the first sensor electrode, the second sensor electrode, or the third sensor electrode;

a shield driver configured to selectively apply a second excitation signal to the first shield electrode, the second shield electrode, the first shield trace, the second shield trace, and others of the first sensor electrode, the second sensor electrode, or the third sensor electrode concurrently with selectively applying the first excitation signal by the signal generator; and a current integrator configured to measure a response signal from one of the first sensor electrode, the second sensor electrode, or the third sensor electrode after applying the first excitation signal to determine a fluid level measurement.

* * * * *